United States Patent [19]
Lacey, Jr.

[11] Patent Number: 5,115,665
[45] Date of Patent: May 26, 1992

[54] FREE PISTON SHOCK TUBE TUNNEL

[75] Inventor: John J. Lacey, Jr., Minnetonka, Minn.

[73] Assignee: Fluidyne Engineering Corporation, Minneapolis, Minn.

[21] Appl. No.: 473,871

[22] Filed: Feb. 2, 1990

[51] Int. Cl.⁵ ............................................. G01M 9/00
[52] U.S. Cl. ........................................... 73/12; 73/147
[58] Field of Search ................................... 73/12, 147

[56] References Cited

U.S. PATENT DOCUMENTS

| | | | |
|---|---|---|---|
| 2,836,063 | 5/1958 | Yoler et al. | 73/147 |
| 3,431,777 | 3/1969 | Norfleet | 73/12 X |
| 3,495,455 | 2/1970 | Allgood | 73/12 X |
| 4,898,028 | 2/1990 | Brehm | 73/147 |

FOREIGN PATENT DOCUMENTS 8902071 3/1989 PCT Int'l Appl. ................ 73/147

Primary Examiner—Charles A. Ruehl
Attorney, Agent, or Firm—Dorsey & Whitney

[57] ABSTRACT

A free piston shock tube/tunnel having a mechanism for increasing the holding time, without correspondingly increasing viscous losses in which the shock tube/tunnel includes a diaphragm positioned in the area of connection between the compression tube and the shock tube and a selectively replaceable orifice insert positioned near the diaphragm in which the orifice insert has an opening with a diameter less than the internal diameter of the shock tube.

14 Claims, 3 Drawing Sheets

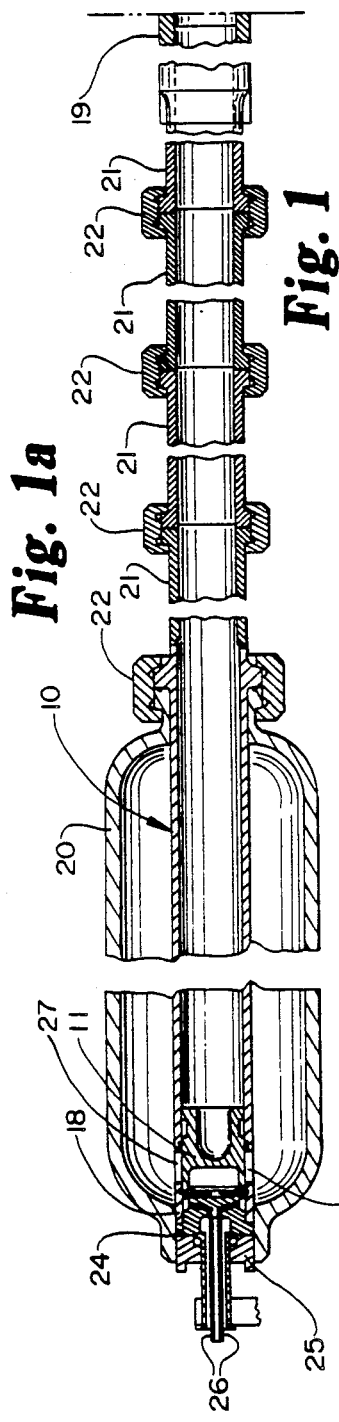
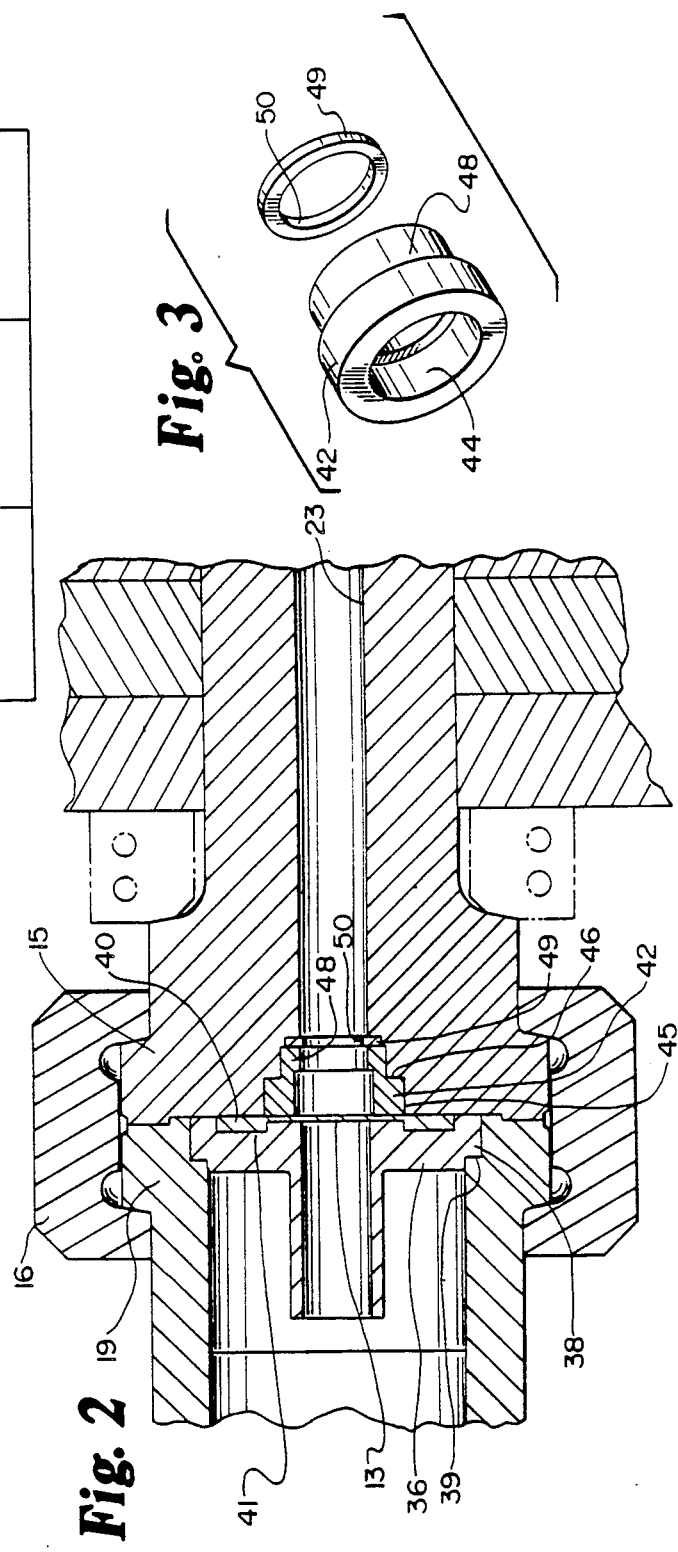

FREE PISTON SHOCK TUBE TUNNEL

BACKGROUND OF THE INVENTION

A. Field Of The Invention

The present invention relates to a free piston shock tube/tunnel, and more particularly, to a free piston shock tube/tunnel having means to control and optimize the holding time and thus the test time for a particular shock tube structure, without resulting in a corresponding increase in viscous losses.

B. Description Of The Prior Art

Free piston shock tube/tunnels have existed since the 1950's. During operation, free piston shock tube/tunnels are able to generate a shock wave of extremely high pressure and high temperature at a test site for a desired duration or test time for the purpose of providing test conditions for aerodynamic studies. Free piston shock tube/tunnels are principally used to test the aerodynamic conditions relating to rocket nose cones, space re-entry vehicles, and other hypersonic aircraft.

In general, a free piston shock tube/tunnel includes an elongated, generally cylindrical compression tube containing a compression or driver gas such as helium. The compression tube is closed at one end by a diaphragm with a preselected rupture pressure and includes a compression piston adapted for movement from the piston starting end forward toward the diaphragm end. Connected to the diaphragm end of the compression tube is an elongated shock tube having a test end remote from the diaphragm and being filled with a low pressure driven gas such as ambient air. When the piston is moved from the piston starting end of the compression tube toward the diaphragm end, the compression gas within the compression tube is compressed, thus causing the diaphragm to rupture. The rupturing of the diaphragm causes a volume of the compressed compression gas to pass through the ruptured diaphragm and into the connected shock tube generating the shock wave. The shock wave compresses the driven gas during movement through the shock tube, thereby creating the desired test conditions at the test site. In the case of a shock tunnel, the shock wave compressed gas is further processed through a nozzle expansion to the final test site.

The piston in a conventional free piston shock tube/tunnel is driven by compressed gas introduced behind the piston. During the compression movement of the piston toward the diaphragm, the gas in the compression tube can be compressed to pressures as high as 2,000 atmospheres or greater. This in turn can generate a shock wave in the shock tube which can create test conditions in the driven gas with temperatures as high as 12,000K and pressures as high as 3,000 atm.

In prior art free piston shock tube/tunnels, the shock tube is of generally cylindrical construction having a single, constant diametrical dimension less than that of the diametrical dimension of the compression tube. In typical free piston shock tunnel structures, the diameter of the compression tube is at least about three times greater than the diameter of the shock tube.

Despite the utilization of free piston shock tube/tunnels for nearly 40 years, and despite continuing studies for the purpose of more fully understanding the operation, and optimizing the performance, of free piston shock tube/tunnels, their general construction has not changed significantly. A typical free piston shock tunnel is disclosed in Patent Cooperation Treaty publication number WO 89/02071 by Raymond Stalker. Published studies relating to the performance and operation of free piston shock tube/tunnels include an article entitled "Pressure Losses In Free Piston Driven Shock Tubes" by N. W. Page and R. J. Stalker in Shock Tubes and Waves (14th International Symposium on Shock Tubes and Shock Waves), August, 1983 at page 118 and an article entitled "The Piston Motion In A Free Piston Driver For Shock Tubes And Tunnels" by Hans G. Hornung at GALCIT, California Institute Of Technology, 1988.

A concept introduced in the above identified article by Hans G. Hornung is that of holding time. As defined by Mr. Hornung and generally accepted in the art relating to free piston shock tube/tunnels, holding time is the time interval over which the pressure in the compression tube deviates from its maximum value by 10% or less. This, of course, occurs near the end of the piston travel and shortly after rupturing of the diaphragm. It is known that the holding time and the test time (the duration of desired test conditions at the test site) are related. Increasing the holding time will generally result in a corresponding increase in the test time at the test end of the shock tube. It is also known that for a given design of compression tube and piston, longer holding times can be generated by decreasing the diameter of the shock tube. As the shock tube diameter is decreased, however, the viscous losses increase. Viscous losses are those losses resulting from frictional forces acting between the shock tube wall and the flow behind the shock wave as it moves through the shock tube. An increase in viscous losses tends to decrease the test time. Thus, there is a limit to how much the test time can be increased by reducing the diameter of the shock tube.

Further, because of the generally fixed and unalterable nature of currently existing free piston shock tunnels, the cost associated with such shock tunnels and their use is extremely high. For example, if one wishes to alter the test conditions, such as by reducing or increasing the diameter of the shock tube, significant rework is needed. This results in extremely high costs and significant down time. Accordingly, the ability of current free piston shock tubes/tunnels to be used for a wide variety of different tests and applications is extremely limited.

Accordingly, there is a need in the art for an improved free piston shock tube/tunnel construction by which the holding time can be increased, thereby allowing longer test time, without a corresponding increase in viscous losses. There is also a need for a free piston shock tube/tunnel of a given construction which has applicability for a variety of different test environments and which can be quickly and easily altered to provide different desired holding times and test conditions.

SUMMARY OF THE INVENTION

In contrast to the prior art, the free piston shock tube/tunnel of the present invention includes a structure which provides for an increase in the holding time, and thus the ability to increase the test time, without a corresponding increase in viscous losses. Further, the free piston shock tube/tunnel of the present invention provides a means for quickly, easily and inexpensively controlling the holding time for a particular shock tube/tunnel construction so as to selectively provide a test time and test conditions which are desired for a particular application. This results in dramatically improved flexibility of performance of a particular free piston shock tube/tunnel construction and enables such shock tube/tunnel to be used for a wide variety of applications. This significantly reduces the cost of operation for a particular application and enables the performance of the shock tube/tunnel to be maximized by increasing the holding time without a corresponding increase in viscous losses.

More specifically, the free piston shock tube/tunnel of the present invention includes the incorporation of a selectively replaceable orifice insert in close proximity to the diaphragm in which the orifice insert has an opening with a diameter less than the internal diameter of the shock tube. It has been found that with such a construction, the reduced diameter of the opening in the orifice insert results in an increase in holding time, which can provide a longer test time. After passing the reduced diaphragm opening, the shock wave moves along the shock tube toward the test site. However, because the diameter of the shock tube is greater than the diameter of the opening in the orifice insert, the resulting viscous losses are correspondingly reduced. This results in dramatically improved test times when compared to prior art free piston shock tube/tunnels having a shock tube without such an orifice insert.

Accordingly, it is an object of the present invention to provide an improved free piston shock tube/tunnel having means to increase the holding time and thus the test time.

Another object of the present invention is to provide an improved free piston shock tube/tunnel in which the holding time can be increased, without a corresponding increase in the viscous losses.

A further object of the present invention is to provide an improved free piston shock tube/tunnel which, for a given construction, can be utilized in a variety of applications and is capable of providing a variety of different test times and test conditions at the test site.

A still further object of the present invention is to provide an improved free piston shock tube/tunnel in which a selectively replaceable orifice insert is incorporated in the vicinity of the diaphragm to alter and control the holding time, without resulting in a corresponding increase in viscous losses.

These and other objects of the present invention will become apparent with reference to the drawings, the description of the preferred embodiment and the appended claims.

DESCRIPTION OF THE DRAWINGS

FIG. 2 is an enlarged view, partially in section, of the portion of the free piston shock tube/tunnel in the area of connection between the compression tube and shock tube showing a preferred position of the orifice insert.

FIG. 3 is an enlarged perspective view showing the diaphragm impact ring and associated orifice insert.

DESCRIPTION OF THE PREFERRED EMBODIMENT

Figure 1B:
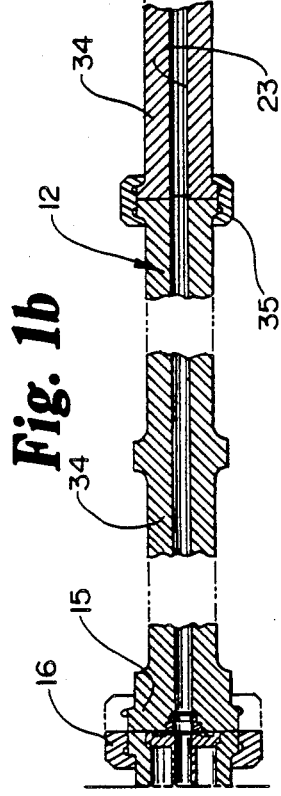
FIG. 1 is comprised of FIGS. 1a, 1b and 1c and is a side view, partially in section, of the free piston shock tube/tunnel in accordance with the present invention.
Figure 1C:
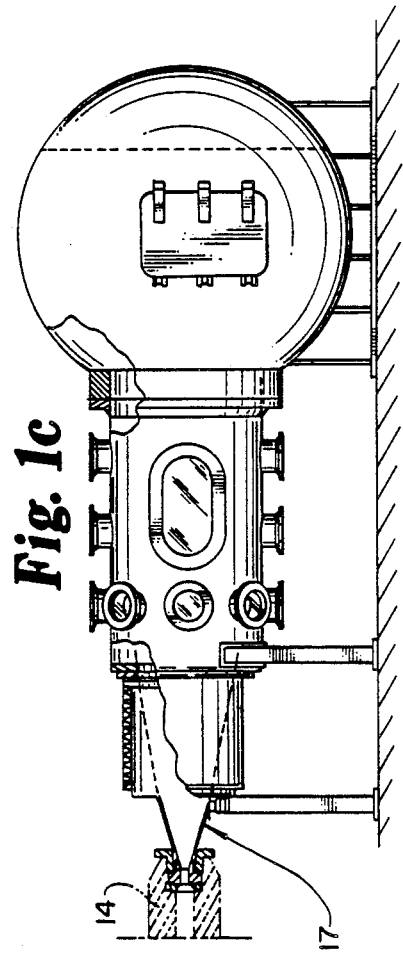

General reference is first made to FIG. 1 showing a side view of the elongated free piston shock tube/tunnel of the present invention. As illustrated, the shock tube/tunnel generally includes an elongated compression tube 10 and an elongated shock tube 12 connected end to end with the compression tube 10 via an appropriate connecting collar 16. A free piston 11 is adapted for movement from one end of the compression tube 10 toward the other for the purpose of compressing a compression gas within the tube 10. A diaphragm 13 (FIG. 2) is positioned in the area of connection between the compression tube 10 and the shock tube 12.

In the preferred embodiment, the compression tube 10 has a generally cylindrical configuration and extends from a first or piston end 18 to a second or diaphragm end 19. Normally, the compression tube 10 is constructed of high strength steel and is sufficient to withstand pressures as high as 2,000 atmospheres and temperature as high as 7,000K. A portion of the compression tube 10 near the piston end 18 is surrounded by a secondary buffer 20 for the purpose of storing the gas which ultimately accelerates the piston. The actual length of the compression tube 10 is a matter of shock tube/tunnel design. Generally, it is contemplated that the compression tube in a free piston shock tube/tunnel in accordance with the present invention will be at least 33 meters in length. In the preferred embodiment it is shown that the compression tube 10 is made up of a plurality of compression tube sections 21. These are connected with one another by corresponding split hub clamps 22 in a manner known in the art. The compression tube 10 is filled with a driver gas such as helium which is capable of undergoing a generally quasi-steady adiabatic compression during movement of the piston. Various other gases, however, may also be used.

The piston end 18 of the compression tube 10 is closed by a closure head 24 which is retained relative to the compression tube 10 and the buffer 20 via the end nut 25. The end nut 25 is threadedly retained by internal threads at the end of the buffer 20. Conventional means 26 are provided for the purpose of introducing a compressed piston driving gas behind the piston 11 for the purpose of driving the piston toward the right as viewed in FIG. 1. As the piston 11 moves forwardly toward the right as viewed in FIG. 1, the ports 27 in the compression tube 10 are opened. This allows the gas from the secondary buffer 20 to flow into the volume behind the piston 11, to thereby cause its acceleration. The buffer gas can be compressed to a pressure of 200 atm. or greater. It is contemplated that the mechanism for controlling the actuation and driving of the piston 11 will be similar to those known in the art.

Figure 5:
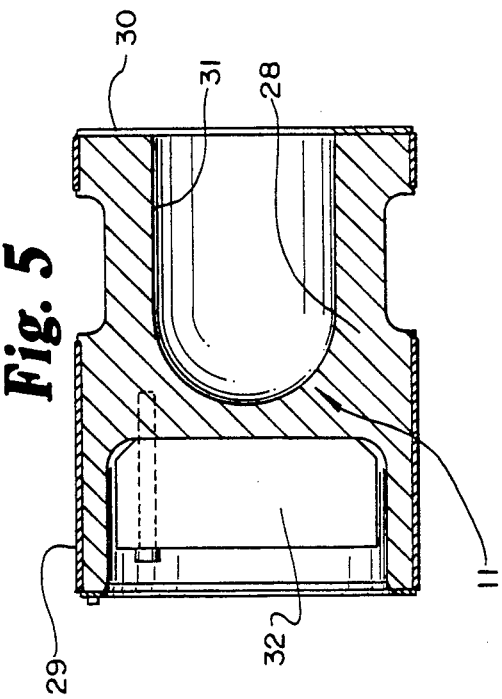
FIG. 5 is a cross-sectional view of the piston.

As illustrated in FIG. 5, the piston includes a main body 28, a pair of outer surface bearings 29 and a strike plate 30. The body 28 includes a recessed portion 31 to accommodate an energy absorption mechanism or the like. The piston further includes a weight material 32 which provides the piston 11 with sufficient mass to perform the desired compression during operation of the shock tube/tunnel. During movement of the piston 11 from the piston end 18 toward the diaphragm end 19, the bearings 29 slide along the inside cylindrical surface of the compression tube 10.

The shock tube 12 includes a first or diaphragm end 15 and a second or test end 14. As illustrated in FIG. 1 and also in FIG. 2, the diaphragm end 15 of the shock tube 12 is connected with the diaphragm end 19 of the compression tube 10 via the hub clamp 16. The test end 14 of the shock tube 12 is provided with any appropriate test mechanism desired. The preferred embodiment illustrated in FIG. 1 illustrates a conventional test end for a shock tunnel, with a conventional test nozzle structure 17 associated with the shock tube 12 for testing purposes. It is contemplated, however, that the nozzle structure 17 could be removed, with the structure of the present invention operating as a free piston shock tube.

The shock tube 12 of the preferred embodiment has a generally cylindrical or tubular configuration with an exterior cylindrical surface and an internal cylindrical bore 23. The shock tube 12 is preferably constructed of a material such as high strength steel.

The actual length of the shock tube 12 is a matter of design based upon the test conditions desired and various other parameters. In the preferred embodiment, the test tube 12 is comprised of a plurality of shock tube sections 34 which are connected in end-to-end relationship with one another via split hub clamps 35.

As illustrated best in FIG. 2, a diaphragm 13 is positioned and retained in the area of connection between the diaphragm ends 19 and 15 of the compression tube 10 and shock tube 12, respectively. The diaphragm 13 which has a predetermined rupture pressure is retained by a diaphragm retaining plate 36 disposed at the diaphragm end 19 of the compression tube 10. The diaphragm retaining plate 36 is provided with an outer annular shoulder portion 38 which fits within and is retained by a corresponding annular recessed area 39 in the end 19. The diaphragm 13 is a conventional diaphragm existing in the shock tube/tunnel art having an enlarged annular portion 40 seated within an annular recess 41 in the diaphragm retaining plate 36.

The diaphragm end 15 of the shock tube 12 is provided with a replaceable diaphragm impact ring 42 which is seated within a corresponding recess in the end 15. The impact ring 42 includes an outer annular shoulder portion 45 which is adapted for seating engagement within a corresponding recess 46 in the end 15. An inner recessed surface portion 44 is provided in the impact ring 42 for the purpose of accommodating the petals of the diaphragm 13 when it ruptures. Specifically, the length of the recessed surface portion 44 is designed such that when the diaphragm 13 ruptures, the ruptured diaphragm will substantially conform to the recessed surface portion 44, thus precluding any restriction within the shock tube. The outermost end 48 of the impact ring 42 also seats within a corresponding recessed portion of the end 15. The end portion 48 is provided with an internal diameter approximating the internal diameter of the shock tube 12.

Positioned between the forward end surface of the end 48 and a recessed surface of the shock tube 12 is a selectively replaceable orifice insert 49 having a pair of flat, generally parallel surfaces which are captured and retained between the outermost end of the impact ring 42 and a portion of the shock tube 12. The orifice insert 49 is provided with an internal opening 50 having a diameter less than the internal diameter of the shock tube 12.

It has been found that by use of the orifice insert 49 having an opening 50 with a diameter less than the diameter of the shock tube 12, the holding time in the compression tube 10 can be increased. As described above, the holding time is that time interval over which the pressure in the compression portion of the compression tube deviates from its maximum value by 10% or less. In general, increasing the holding time will correspondingly increase the test time at the test end 14 of the shock tube 12. This is normally a desired result in that it provides longer test times than could be achieved without the use of such an orifice insert. In addition to increasing the holding time, and thus the test time at the test end 14, it does so without a corresponding increase in viscous losses. For purposes of the present invention, and as known in the art, viscous losses are those losses to the shock wave as it moves through the shock tube 12 resulting from frictional forces between flow behind the shock wave and the inner side walls of the shock tube 12. In general, the larger the diameter, the less the viscous losses, and the smaller the shock tube diameter, the greater the viscous losses. Viscous losses acting on the flow behind a shock wave tend to hold back the peripheral edges of the flow, thus resulting in reduced gas available for the actual test; thereby resulting in decreased test time.

As a result of using an orifice insert 49 as illustrated, the holding time, and thus the test time for a free piston shock tube/tunnel of given construction can be increased and/or controlled, without a corresponding increase in viscous losses. This has a significant advantage in shock tube/tunnel design and applicability. For example, by replacing the orifice insert 49 with an insert of a different opening size 50, a different holding time and thus test time can be achieved, again without increasing or otherwise appreciably altering the viscous losses. Thus, the use of a selectively replaceable orifice insert such as the insert 49 dramatically increases the flexibility and usefulness of a particular shock tube/tunnel configuration.

In the preferred embodiment, the orifice insert 49 is positioned downstream from, or on the test end side of, the diaphragm 13. As will be described below with respect to FIG. 6, however, it is contemplated that the replaceable orifice insert 49 could also be provided upstream or on the piston end side of the diaphragm 13 and still achieve the advantages of the present invention. It should also be noted in FIG. 2, that the orifice insert 49 is preferably spaced downstream from the diaphragm 13 a distance at least equal to the petal length of the ruptured diaphragm. This petal length is equal to about one-half the diameter of that portion of the diaphragm 13 disposed within the internal opening of the impact ring 42.

It is also preferable that the orifice insert 49 be positioned close enough to the diaphragm so as to provide the benefits of increasing the holding time. Preferably, the orifice insert 49 should be spaced from the diaphragm 13 no greater than about 1% of the length of the shock tube 12. For example, if the shock tube 12 is 17 meters in length, the insert 49, and thus the orifice 50, should be spaced from the diaphragm 13 no greater than about 17 centimeters.

The insert 49 is preferably constructed of a material such as steel which is sufficiently strong to withstand forces resulting from the compressed air and shock wave passing through it. The insert 49 should also have sufficient thickness in the longitudinal direction of the shock tube 12 to provide the insert with sufficient strength and resistance to distortion caused by compressed air and shock wave forces. While the orifice is shown as having sharp cornered entrance and exit, these may be rounded to reduce pressure losses.

Figure 4:
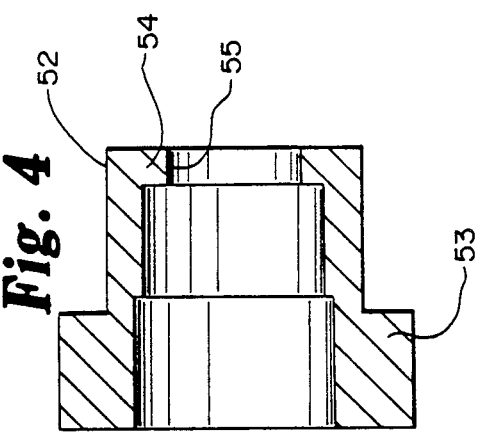
FIG. 4 is a side cross-sectional view showing a modified diaphragm impact ring with the orifice insert incorporated therein.

The preferred embodiment shows the orifice insert 49 as a separate element. It is contemplated, however, that the orifice insert 49 could be incorporated and integrally formed with the diaphragm impact ring 42, or vice versa, without deviating from the advantages of the present invention. A sectional view of such a modified insert 53 is illustrated in FIG. 4. As shown in FIG. 4, the outer end 52 of the modified and combined impact ring orifice insert 53 is provided with an inwardly extending annular portion 54 defining the orifice portion. Such portion 54 includes an opening 55 with a diameter less than the internal diameter of the shock tube 12.

Figure 6:
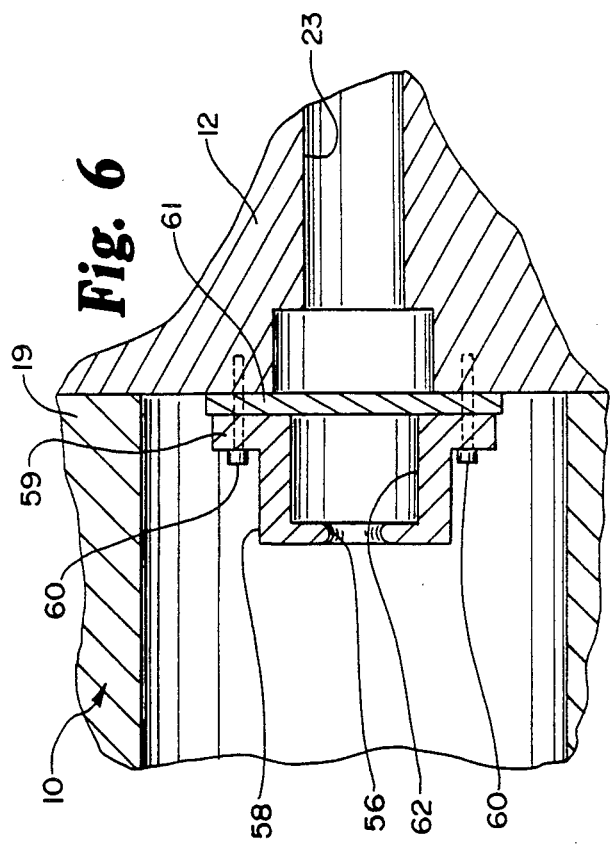
FIG. 6 is an enlarged view, partially in section, showing an alternative structure and positioning of the orifice insert in the free piston shock tube/tunnel of the present invention.

Reference is next made to FIG. 6 showing an alternate embodiment in which the replaceable orifice is positioned upstream from, or on the compression tube side of, the diaphragm. In the embodiment of FIG. 6, the orifice 56 is formed within an end of a replaceable orifice insert 58. The insert 58 has a generally cylindrical configuration and includes an outer flange portion 59 having a plurality of peripheral openings to receive the connecting bolts 60. The bolts 60 extend through the flange portion 59, through corresponding openings in the diaphragm 61 and then are threadedly received within the end of the shock tube 12. Thus, the diaphragm 61 and the insert 58 are connected to the tube 12 by the bolts 60. The insert 58 also includes an inner cylindrical surface portion 62 having a diameter which is preferably no less than the inner diameter of the shock tube 12. The diameter of the orifice 56 is less than that of the shock tube 12. Preferably, when the orifice 56 is positioned upstream from the diaphragm as in FIG. 6, its position should be such that the volume between the orifice 56 and the diaphragm 61 (the volume within the surface 62) should be less than 1% of the volume of compressed gas in the compression tube 10 at the time of diaphragm rupture.

During operation of the free piston shock tube/tunnel of the present invention, the diaphragm 13 and orifice insert 49 (FIG. 2) or the diaphragm 61 and orifice insert 58 (FIG. 6) are positioned in the area between the compression tube 10 and the shock tube 12. The tubes 10 and 12 are thereafter joined together by the connecting hub 16. The compression tube 10 is then filled with the desired driver gas such as helium. After the material to be tested is properly positioned at the test end 14 of the shock tube 12, the device is ready for actuation. Upon actuation, compressed air is introduced through the compressed air firing lines 26 into the area behind the piston 11. This causes the piston 11 to open the ports 27, allowing the compressed air in the secondary buffer 20 to enter the compression tube 10 behind the piston 11. This causes the piston 11 to move with great acceleration and velocity toward the diaphragm. It is common for the compressed air which drives the piston 11 to be pressurized to as high as 200 atm. or greater. This results in the piston 11 being driven to the diaphragm end 19 in a fraction of a second so that the speed of the piston 11 as it approaches the end 19 of the compression tube 10 will be about 300 meters per second or greater. The movement of the piston in this direction causes the helium within the compression tube to be highly compressed. Normally, such compression will be as high as 2,000 atm. or higher. When it reaches the rupture pressure of the diaphragm, the diaphragm ruptures and the compressed helium rapidly passes through the same, forming a shock wave in the shock tube 12. It is common for diaphragms usable in a free piston shock tube/tunnel of the type described in the present invention to have a rupture pressure of about 2,000 atm. or greater.

The shock wave is defined, in part, by the size and position of the orifice 50 (FIG. 2) or orifice 56 (FIG. 6). Generally, the smaller the orifice opening, the longer the holding time (with a slight reduction in the strength of the shock wave) and thus the longer the test time. As the shock wave travels through the shock tube 12, it compresses the air in the shock tube, thereby creating tremendously high pressures and temperatures when the shock wave reaches the test end 14. During travel of the shock wave through the shock tube 12, the shock wave is distorted to some extent and some of its energy is lost as a result of viscous forces between the internal shock tube wall 23 and the flow behind the shock wave. However, as described above, these losses are minimized as a result of utilization of the orifice insert 49 (FIG. 2) or orifice insert 58 (FIG. 6) in which the orifice 50 or 56, respectively, is smaller in diameter than the inner diameter of the shock tube 12. In the above described shock tube/tunnel, test conditions at the test end 14 can be generated having temperatures as high as 13,000K or higher and pressures as high as 5,000 atm. or higher.

Although the description of the preferred embodiment has been quite specific, it is contemplated that various modifications could be made without deviating from the spirit of the present invention. Accordingly, it is contemplated that the scope of the present invention be dictated by the appended claims rather than by the description of the preferred embodiment.

I claim:

1. A free piston shock tube/tunnel comprising:
   an elongated compression tube having a piston end and a diaphragm end;
   an elongated shock tube having an internal diameter and having a diaphragm end and a test end, said diaphragm end of said shock tube being connected with said diaphragm end of said compression tube;
   a piston in said compression tube adapted for compression movement from said piston end to said diaphragm end of said compression tube;
   a diaphragm positioned in the area of connection between said compression tube and said shock tube; and
   a selectively replaceable orifice insert positioned near said diaphragm, said orifice insert having a single, centrally positioned opening with a diameter less than said internal diameter of said shock tube.

2. The shock tube/tunnel of claim 1 wherein said compression tube and said shock tube are generally cylindrical.

3. The shock tube/tunnel of claim 1 wherein said diaphragm includes a test end side facing the test end of said shock tube and a piston end side facing the piston end of said compression tube and wherein said orifice insert is positioned on the piston end side of said diaphragm.

4. The shock tube/tunnel of claim 3 wherein said orifice insert is spaced from said diaphragm a distance such that the volume between said orifice insert and said diaphragm is less than about 1% of the volume of compressed gas in said compression tube between said diaphragm and said piston at the time of diaphragm rupture.

5. The shock tube/tunnel of claim 1 wherein said opening in said orifice insert has a generally circular cross-sectional configuration.

6. The shock tube/tunnel of claim 1 wherein the orifice insert results in an increase in the holding time.

7. A free piston shock tube/tunnel comprising:
- an elongated compression tube having a piston end and a diaphragm end;
- an elongated shock tube having an internal diameter and having a diaphragm end and a test end, said diaphragm end of said shock tube being connected with said diaphragm end of said compression tube;
- a piston in said compression tube adapted for compression movement from said piston end to said diaphragm end of said compression tube;
- a diaphragm positioned in the area of connection between said compression tube and said shock tube and including a test end side facing the test end of said shock tube and a piston end side facing the piston end of said compression tube; and
- a selectively replaceable orifice insert positioned near said diaphragm and on the test end side of said diaphragm, said orifice insert having an opening with a diameter less than said internal diameter of said shock tube.

8. The shock tube/tunnel of claim 7 wherein said orifice insert is spaced from said diaphragm no greater than about 1% of the length of said shock tube.

9. The shock tube/tunnel of claim 8 wherein said orifice insert is spaced from said diaphragm at least one-half the diameter of said shock tube.

10. The shock tube/tunnel of claim 7 wherein said diaphragm is positioned between said compression tube and said shock tube.

11. The shock tube/tunnel of claim 10 wherein said shock tube further includes a diaphragm impact ring positioned on the test end side of said diaphragm.

12. The shock tube/tunnel of claim 11 wherein said orifice insert is positioned and retained between said diaphragm impact ring and a portion of said shock tube.

13. The shock tube/tunnel of claim 12 wherein said orifice insert is incorporated into said diaphragm impact ring.

14. A method of increasing the holding time in a free piston shock tube/tunnel comprising the steps of:
- providing a compression tube having a piston end and a diaphragm end;
- providing a shock tube having a diaphragm end and a test end and further having an internal diameter;
- providing means for selectively connecting the diaphragm end of said compression tube with the diaphragm end of said shock tube;
- providing a replaceable diaphragm between the diaphragm ends of said compression and shock tubes; and
- providing a replaceable orifice insert near said diaphragm in which said orifice insert includes a single, centrally positioned opening having a diameter less than the internal diameter of said shock tube.

* * * * *